US012573772B2

(12) United States Patent
Schroedl

(10) Patent No.: US 12,573,772 B2
(45) Date of Patent: Mar. 10, 2026

(54) ONE-WAY LOCKING WIRE CONNECTOR WITH HARD STOPS

(71) Applicant: Copperhead Industries, LLC, Monticello, MN (US)

(72) Inventor: Trevor Schroedl, Big Lake, MN (US)

(73) Assignee: COPPERWELD GROUP, INC., Brentwood, TN (US)

( * ) Notice: Subject to any disclaimer, the term of this patent is extended or adjusted under 35 U.S.C. 154(b) by 315 days.

(21) Appl. No.: 18/508,478

(22) Filed: Nov. 14, 2023

(65) Prior Publication Data

US 2025/0158297 A1 May 15, 2025

(51) Int. Cl.
*H01R 4/2412* (2018.01)
*H01R 13/639* (2006.01)

(52) U.S. Cl.
CPC ......... *H01R 4/2412* (2013.01); *H01R 13/639* (2013.01)

(58) Field of Classification Search
None
See application file for complete search history.

(56) References Cited

U.S. PATENT DOCUMENTS 3,980,380 A * 9/1976 Cieniawa ............... H01R 24/38 439/656
4,157,208 A * 6/1979 Roberts ................ H01R 43/015 439/204
10,741,934 B2 * 8/2020 Lybrand ............... H01R 4/2425
2015/0280331 A1 * 10/2015 Acera .................. H01R 4/2433 439/395

FOREIGN PATENT DOCUMENTS

DE 112020002803 T5 * 3/2022 ........... H01R 4/4823

OTHER PUBLICATIONS

Snakebite™ Locking Connector Data Sheet from Copperhead Industries, copperheadwire.com. No date available.

* cited by examiner

*Primary Examiner* — Tho D Ta

(74) *Attorney, Agent, or Firm* — Westman, Champlin & Koehler, P.A.

(57) ABSTRACT

A wire connector configured to connect at least two wires includes a first portion and a second portion rotatably connected to the first portion. The first portion includes a plurality of spaced apart through bores in the first main body and opposing first stops extending from the exterior surface. The second portion includes a combination insulation piercing and wire connecting member having a plurality of apertures with arcuate slots extending from each of the plurality of apertures and opposing second gripping tabs, wherein opposing second gripping tabs are located about 180° from each other. When the opposing second gripping tabs abut each of the opposing first stops, the member is in a first position where wires can be positioned into the second portion through the member.

20 Claims, 8 Drawing Sheets

ONE-WAY LOCKING WIRE CONNECTOR WITH HARD STOPS

BACKGROUND

The present disclosure relates to a toolless, one-way rotating wire connector that pierces the insulation around at least two wires with a conductive connector to make a connection. More particularly, the present disclosure relates to a toolless, one-way rotating wire connector having a first positive stop when the connector is in an open position and a second positive stop when the connector is in a connected position.

Some utility supply lines are constructed of plastic piping or conduit and are buried underground. As the utility lines are non-conductive, conductive tracer wire is buried along with them. A signal is sent along the tracer wire that can be detected by a locator above ground. As the locator moves, it senses a signal along the tracer wire and the location of utility lines can be determined along its length.

Ideally, a single uninterrupted tracer wire is positioned along the length of the utility lines for purposes of increased reliability. However, due to the length of wire on a spool relative to the length of the utility, and several other design and layout considerations, lengths of the tracer wire need to be cut and connected with connectors to allow the signal to travel along the connected lengths of wire to detect the location of the utility line.

Connectors have been developed that allow ends of lengths of tracer wires to be connected without the need of stripping the insulation from the wire using a rotating connector that pierces the insulation to electrically connect the ends of the lengths of wires. However, the connectors can have alignment issues due to the ability of one portion of the connector to rotate relative to another portion of the connector. Also, in some instances the connector can be over-rotated which can result in the connector top and bottom to become disconnected and inoperable.

There is a need for a connector having positive stop to align the wire ports in the open position with openings in the connecting plate and to ensure the connector is only rotated to the closed position where the connection between the wires is made and not over-rotated. There is also a need for a connector that once positioned into the closed, connecting position to be retained in the closed position, such that the connector cannot be reopened.

SUMMARY

An aspect of the present disclosure relates to a wire connector configured to connect at least two wires. The wire connector includes a first portion with a first main body having a first end and a second end and an exterior surface and a plurality of spaced apart through-bores in the first main body extending from the first end to the second end. Opposing first stops extend from the exterior surface of the first portion where a portion of each of the first opposing stops extend above the first end. The opposing first stops are located about 180° from each other. The wire connector includes a second portion rotatably coupled to the first main body. The second portion includes a second main body having an interior space and a combination insulation piercing and wire connecting member having a plurality of apertures with arcuate slots extending from each of the plurality of apertures. The second portion includes opposing second gripping tabs extending from an exterior surface of the second main body, wherein opposing second gripping tabs are located about 180° from each other. When each of the opposing second gripping tabs abut each of the opposing first stops, the combination insulation piercing and wire connecting member in a first position wherein each of the plurality of through bores in the first portion is aligned with each of the apertures in the combination insulation piercing and wire connecting member such that insulated wires can be inserted into the interior space of the second portion from the through bores of the first portion.

Another aspect of the present disclosure relates to a toolless wire connector configured to connect at least two tracer wires. The wire connector includes a first portion having a first main body having a first end and a second end and an exterior surface and a plurality of spaced apart through bores in the first main body extending from the first end to the second end. Opposing first gripping tabs extend from the exterior surface of the first main body, wherein the opposing first gripping tabs are located about 180° from each other. Opposing first stops extending from each of the opposing first gripping tabs wherein each of the opposing first stops having a portion extending above the first end. The second portion includes a second main body having an interior space and a combination insulation piercing and wire connecting member comprising a plurality of apertures with arcuate slots extending from each of the plurality of apertures. Opposing second gripping tabs extend from an exterior surface of the second main body, wherein opposing second gripping tabs are located about 180° from each other. When each of the opposing second gripping tabs abut each of the opposing first stops further rotation of the first and second portions relative to each other is substantially prevented. Also, when the second gripping tabs abut each of the opposing first stops, the combination insulation piercing and wire connecting member is in a second, closed or connecting position where the slots in the connecting plate pierce the insulation and engage the conductive wire.

Another aspect of the present disclosure relates to a method of electrically connecting a plurality of tracer wires. The method includes providing a connector comprising a first portion having a first main body having a first end and a second end and an exterior surface and a plurality of spaced apart through bores in the first main body extending from the first end to the second end. The first portion includes opposing first stops extending from the exterior surface and having a portion of each of the first opposing stops extending above the first end, wherein the opposing first stops are located about 180° from each other. The method includes providing a second portion of the connector rotatably coupled to the first main body, the second portion. The second portion includes a second main body having an interior space, a combination insulation piercing and wire connecting member comprising a plurality of apertures with arcuate slots extending from each of the plurality of apertures, and opposing second gripping tabs extending from an exterior surface of the second main body, wherein opposing second gripping tabs are located about 180° from each other. The method includes rotating the first and second portions relative to each other such that the opposing second gripping tabs abuts one of the opposing first stops such that the plurality of apertures in the combination insulation piercing and wire connecting member align with the plurality of spaced apart through bores in the first portion. The method includes inserting an end of a first tracer wire through one of the plurality of spaced apart through bores, one of the plurality of apertures and into the interior space of the second portion. The method further includes inserting an end of a second tracer wire through another one of the plurality of spaced apart through bores, another one of the plurality of apertures and into the interior space of the second portion.

DETAILED DESCRIPTION

Figure 1:
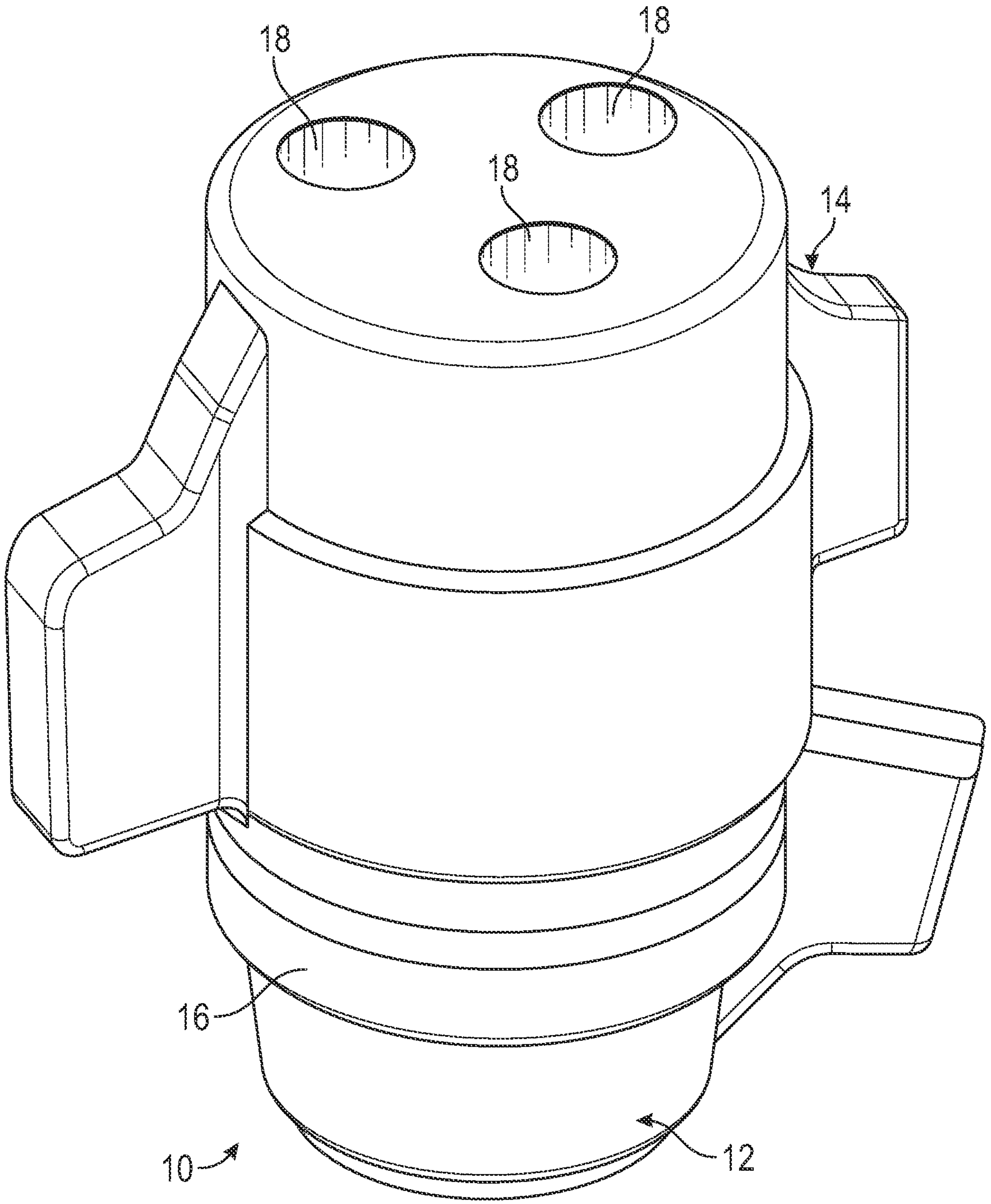
FIG. 1 (Prior Art)
FIG. 1 is an isometric view of a prior art connector.

A prior art wire connector is illustrated in FIG. 1 at 10. The wire connector 10 includes a bottom portion 12 that is rotatably connected to a top portion 14. An interior space of the bottom portion 12 can be optionally filled with a dielectric gel where a seal 16 between the top portion 14 and the bottom portion 12 prevents the dielectric gel from leaking out of the interior space.

Figure 2:
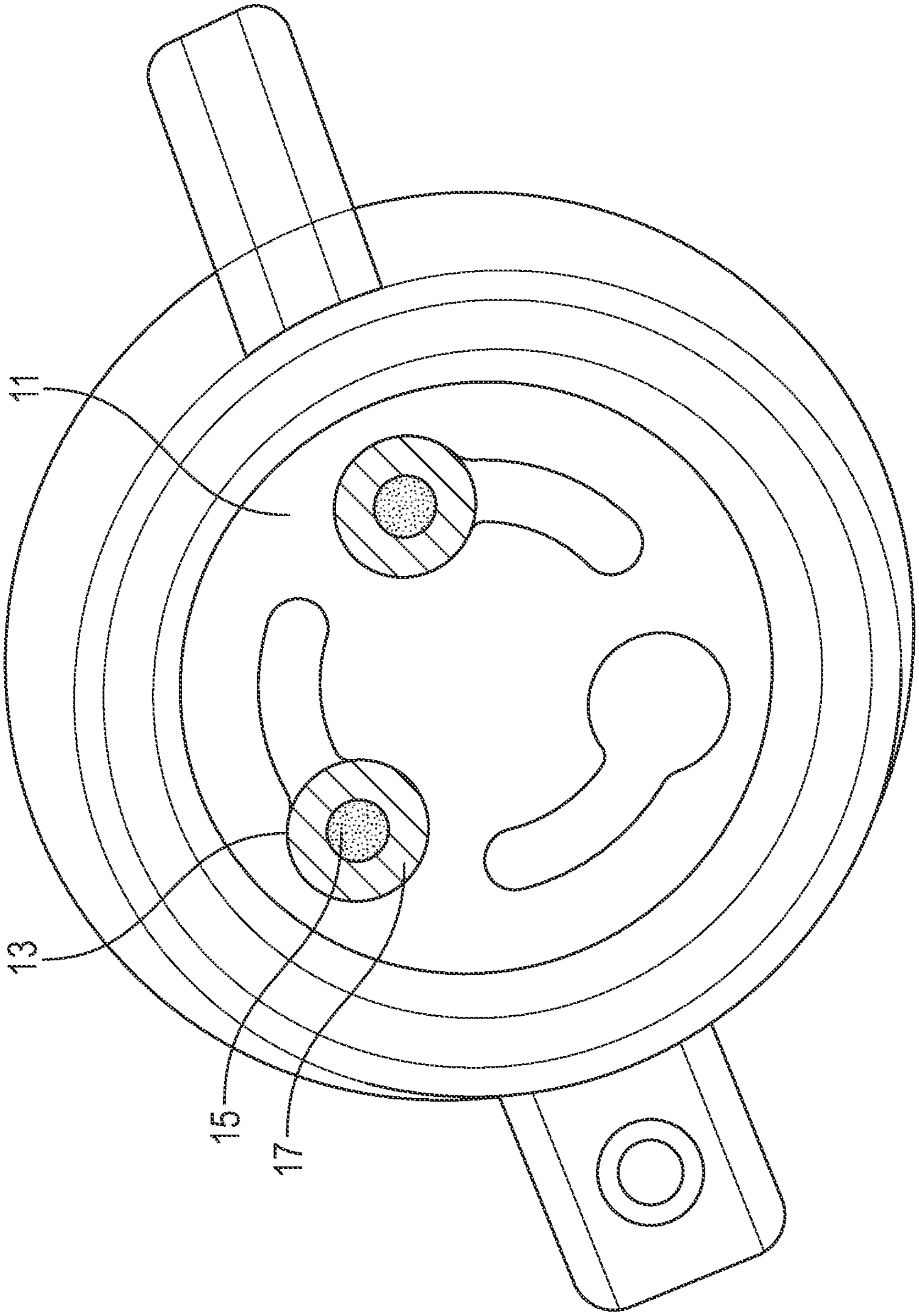
FIG. 2 is a planar view of a combination insulation piercing and wire connecting member in an open, unconnected position.
Figure 3:
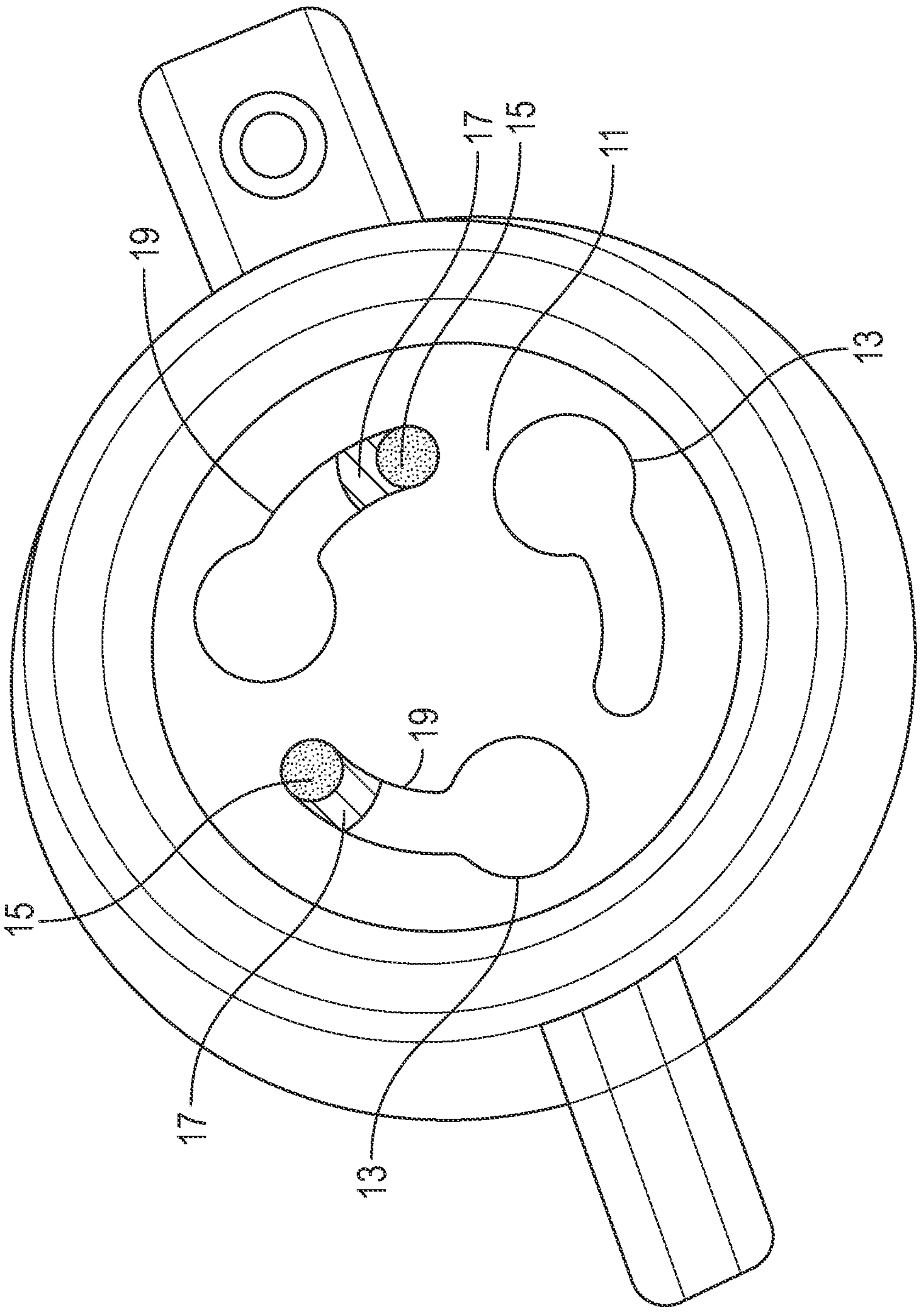
FIG. 3 is a planar view of the combination insulation piercing and wire connecting member in a closed, connecting position.

Referring to FIGS. 1-3, the wire connector 10 includes a combination insulation piercing and wire connecting plate 11 secured to the bottom portion 12 that includes apertures that align with through bores 18 in the top portion 14 when the connector 10 is in the open position. Wires 15 with insulating jackets 17 are then inserted through the through bores 18 and through the aligned aperture 13 in the combination insulation piercing and wire connecting plate 11 such that ends of the wires 15 are within dielectric gel in the bottom portion 12. The top portion 14 and the bottom portion 12 of connector 10 are rotated approximately a quarter turn or about 90° relative to each other such that the wires 15 within the insulation engages a slot 19 in the connecting plate as illustrated in FIG. 3. The slots 19 are sized to a diameter of a particular gauge and pierce the insulating jacket 17 to make electrical contact with the wires 15. The contact of the wires 15 with the combination insulation piercing and wire connecting plate 11 results in an electrical connection between the wires 15.

Figure 4:
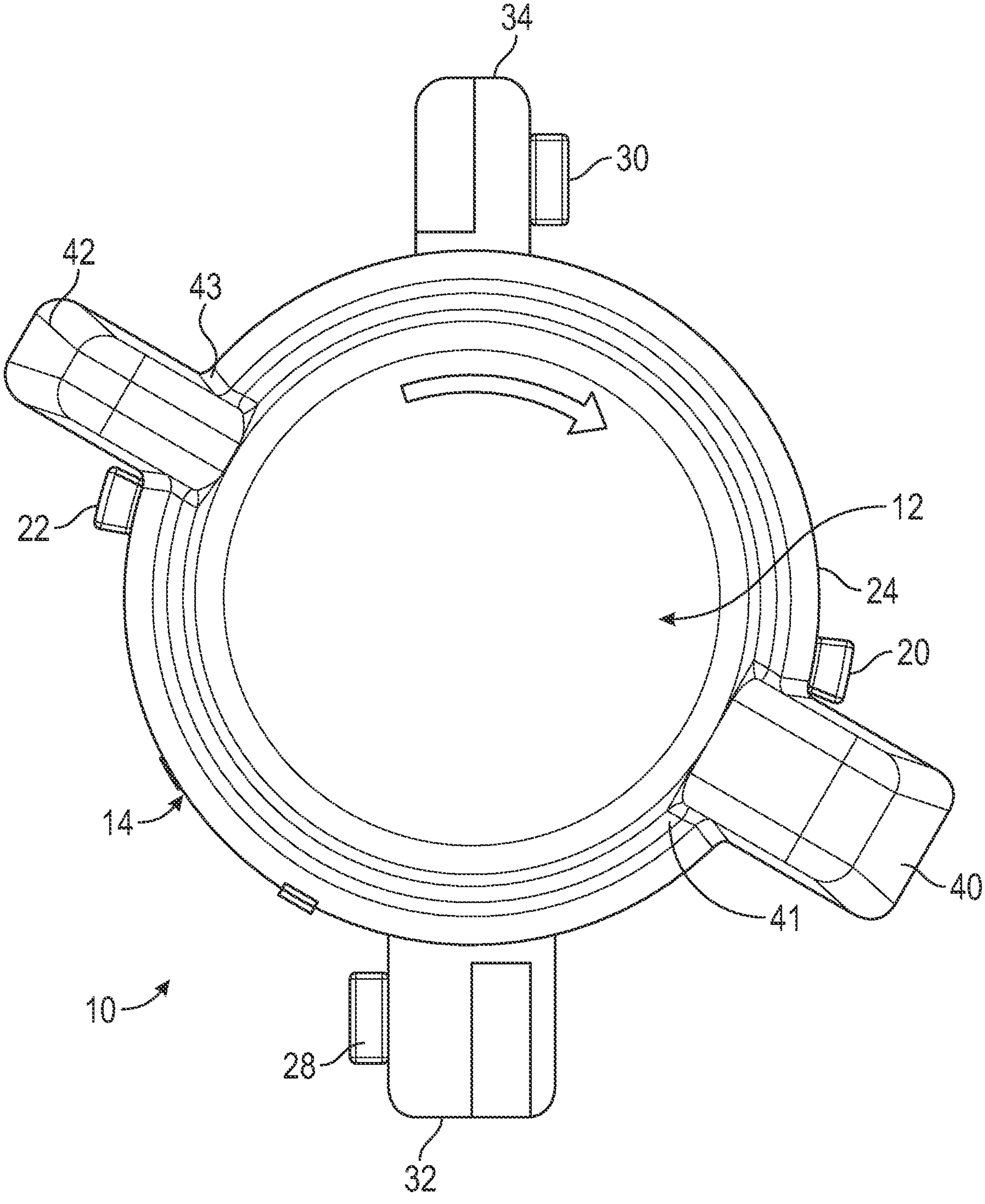
FIG. 4 is a bottom view of the connector of the present disclosure in the open, unconnected position.
Figure 5:
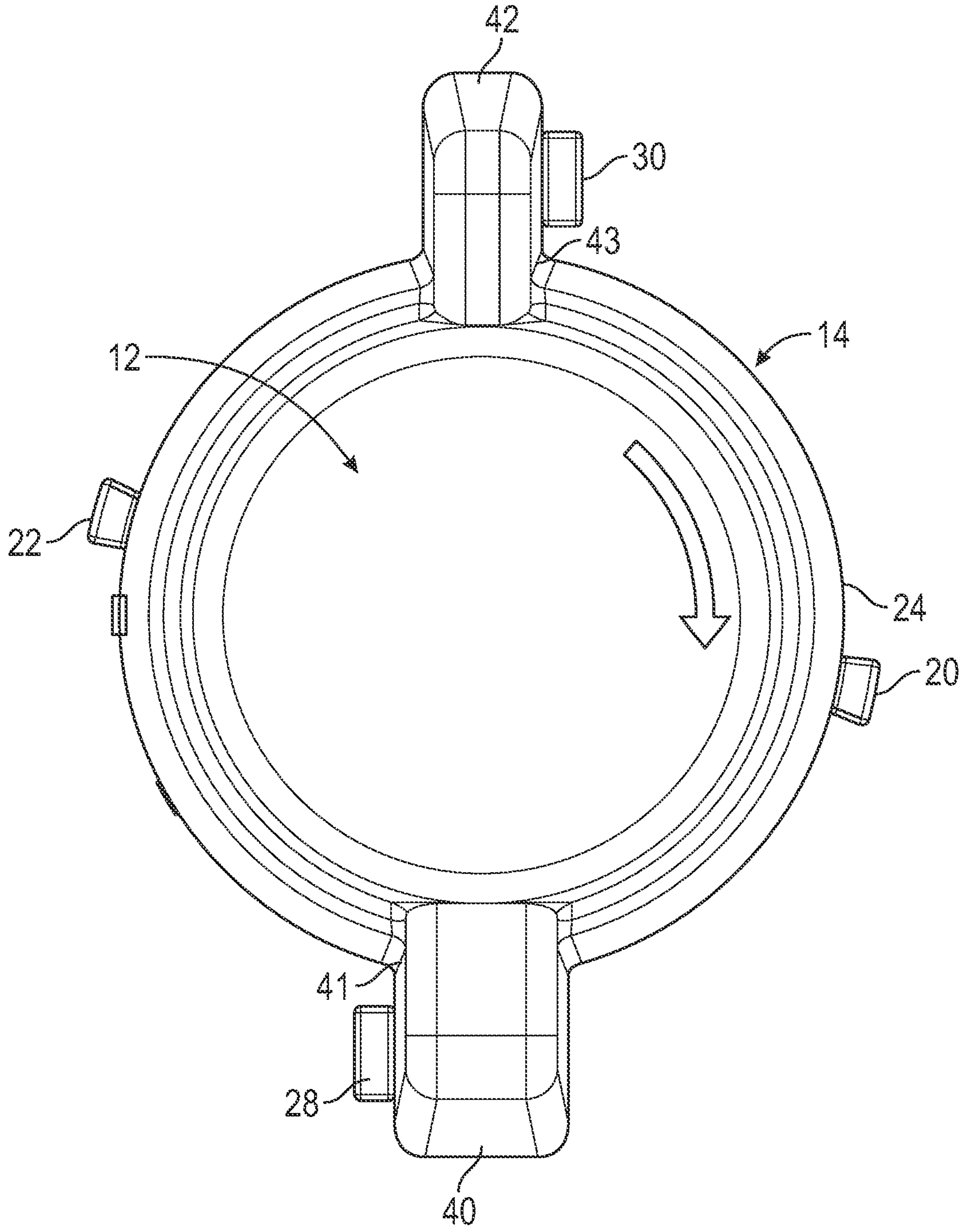
FIG. 5 is a bottom view of the connector of the present disclosure in a closed, connecting position.

Referring to FIGS. 4 and 5, bottom views of the connector 10 of the present disclosure are illustrated. The connector 10 of the present disclosure is positionable between an open, unconnected position (as illustrated in FIG. 4) and a closed, connecting position (as illustrated in FIG. 5) and utilizes positive stops to ensure alignment in the open, unconnected position and prevents over-rotation in the closed, connecting position.

The top portion 14 includes stops 20 and 22 that extend above a substantially, horizontal shoulder 24 where the stop 20 and 22 are located about 180° apart from each other. Bottom gripping tabs 40 and 42 extend from an outer surface 44 of the bottom portion 12 and are located about 180° apart from each other. The bottom portion 12 is rotated relative to the top portion 14 so that the gripping tabs 40 and 42 abut the stops 20 and 22 and the connector 10 is positioned in the open, unconnected position.

Figure 6:
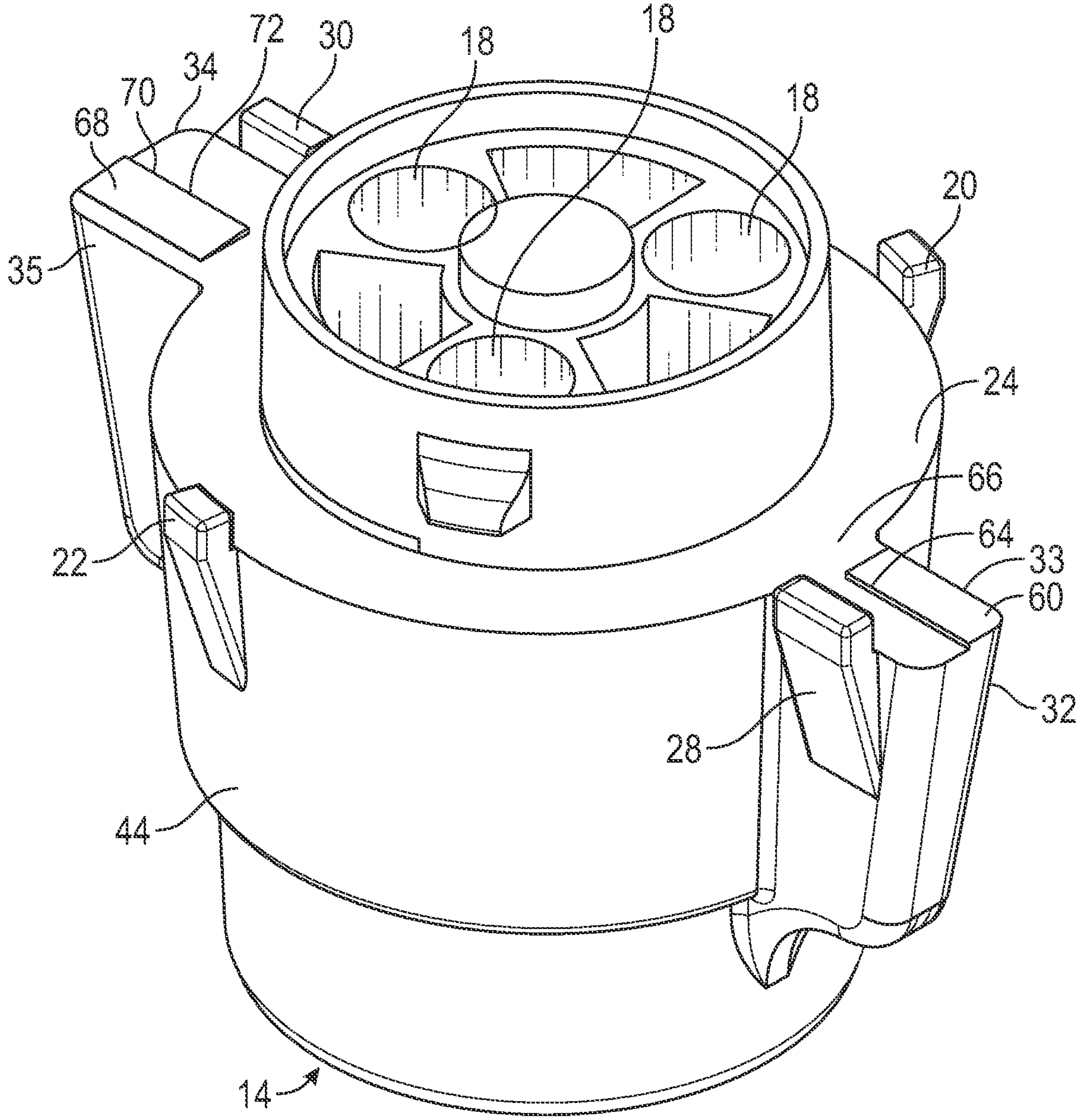
FIG. 6 is an isometric view of a top portion of the connector of the present disclosure.

Referring to FIGS. 4 and 6, when in the open, unconnected position, the through bores 18 in the top portion 14, that are sized to accept a gauge of wire with insulation, are aligned with apertures in the connecting plate (not shown) in the bottom portion 12. At least two wires with insulation are then inserted through the through bores 18 and the apertures 13 in the combination insulation cutting and wire connecting plate 11 and into the dielectric gel in the interior space of the bottom portion 12.

Referring to FIGS. 5, with the ends of the wires 15 within the interior space of the bottom portion 12 and wires 15 with the insulated jacket 17 located within the through bores 18 of the top portion 14, the bottom portion 12 and the top portion 14 are rotated about 90° or about a quarter turn relative to each other until the bottom gripping tabs 40 and 42 engage stops 28 and 30 extending from top gripping tabs 32 and 34, respectively. With the bottom gripping tabs 40 and 42 engaging the stops 28 and 30, the connector 10 is in the closed, connecting position where the combination insulation piercing and wire connecting plate 11 pierces the insulating jacket 17 and creates an electrical connection between the wires 15 and the combination insulation piercing and wire connecting plate 11.

The interaction of the bottom gripping tabs 40 and 42 with the stops 20 and 22 ensures the connector 10 is in the first, open position where wires 15 with insulating jackets 17 can be inserted through the through bores 18 in the top portion 14, the apertures 13 in the combination insulation piercing and wire connecting plate 11 and into the open interior space in the bottom portion 12. The interaction of the bottom gripping tabs 40 and 42 with the stops 28 and 30 prevents further rotation of the bottom portion 12 relative to the top portion 14 such that an electrical connection is made between the wires 15 with the combination insulation piercing and wire connecting plate 11 by piercing the insulating jacket 17 and engaging the conductive wires 15 while also preventing over-rotation of the top portion 14 relative to the bottom portion 12.

Figure 7:
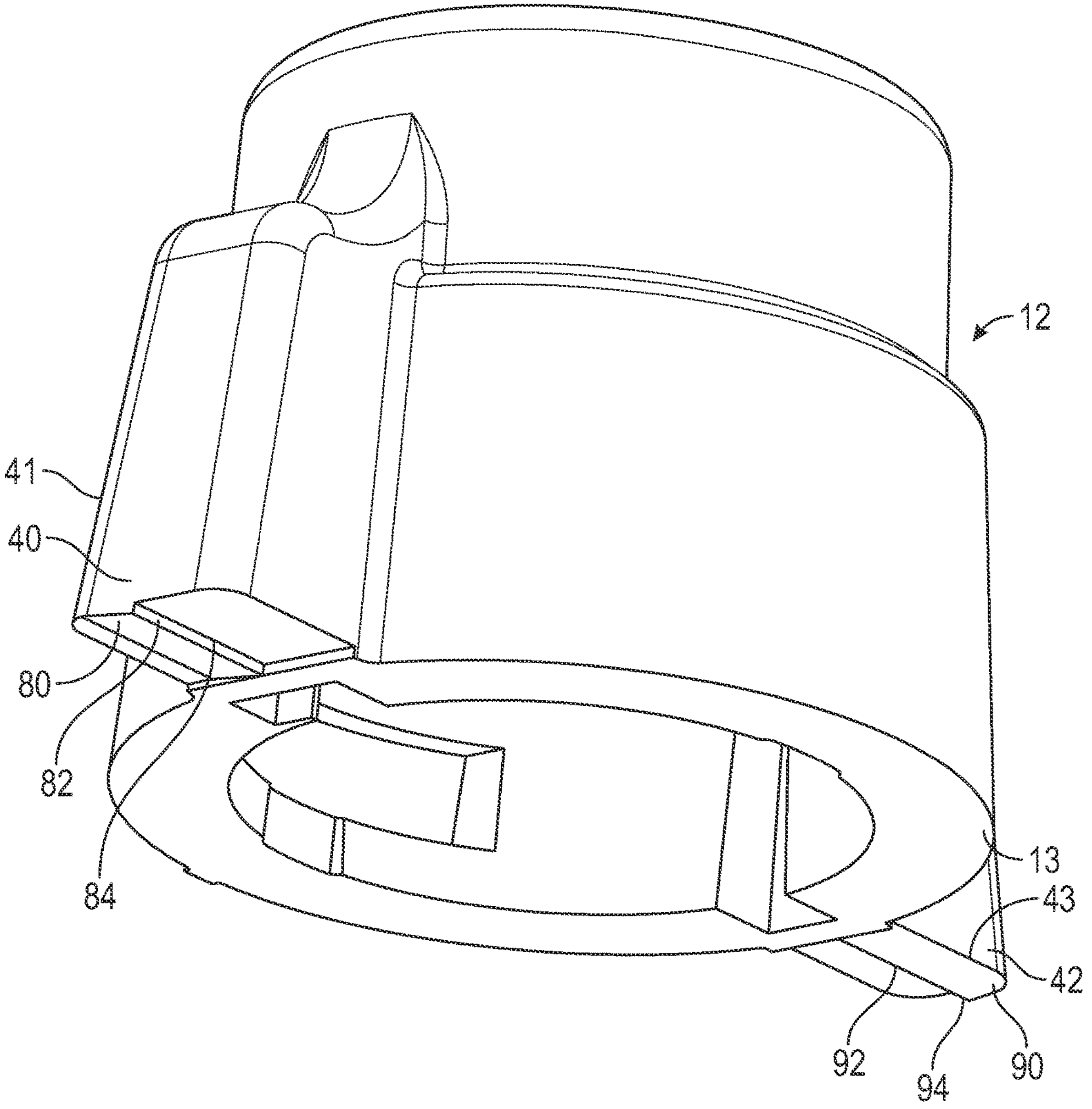
FIG. 7 is an isometric view of a bottom portion of the connector of the present disclosure.
Figure 8:
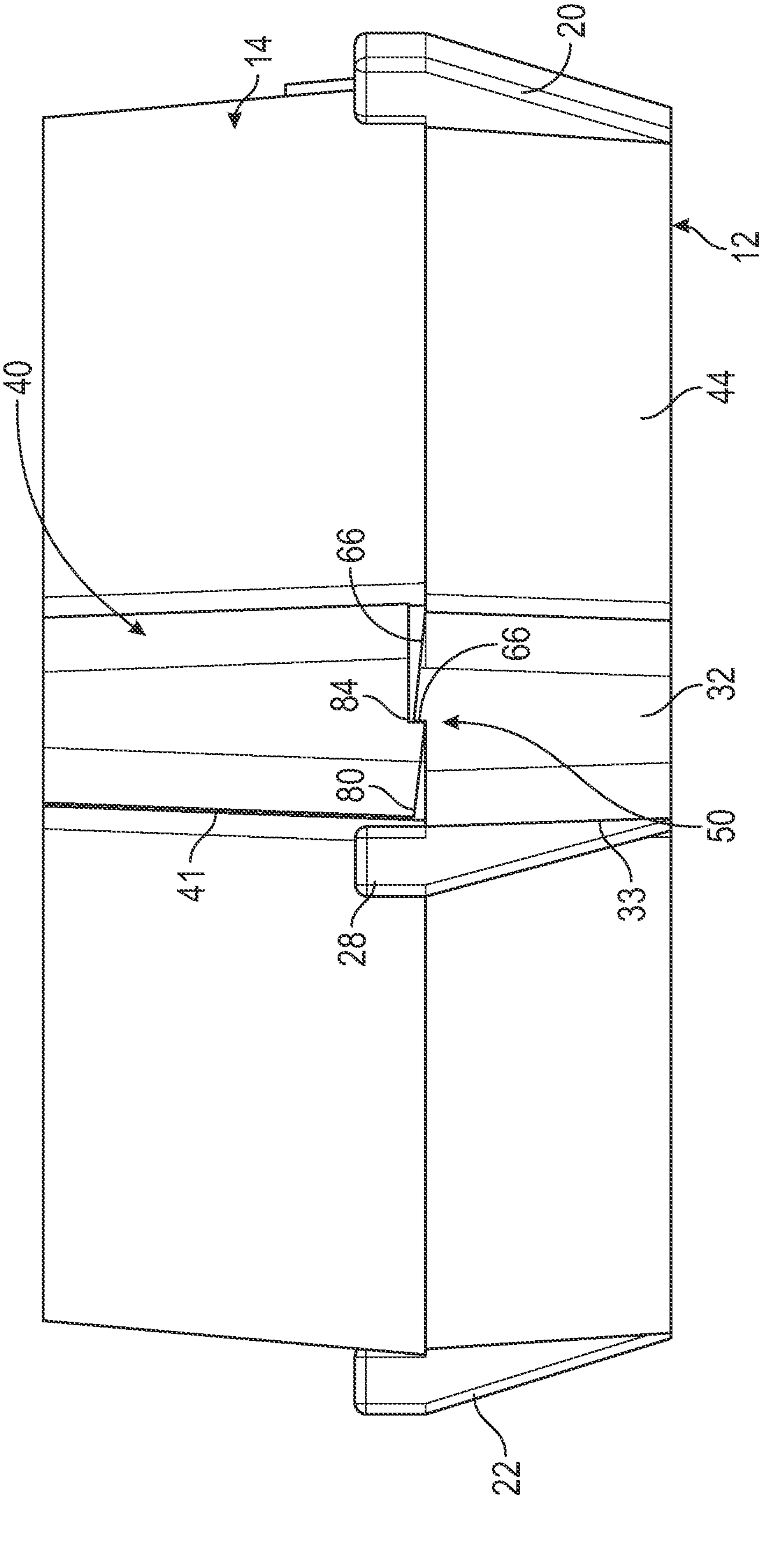
FIG. 8 is a close-up view of the anti-rotation mechanism for the connector in an engaged position.

Referring to FIGS. 6-8, the connector 10 includes an anti-rotation mechanism 50 that prevents the top portion 14 and the bottom portion 12 from rotating in a reverse angular direction relative to the angular direction when the connector 10 is moved from the first, open position to the second, closed position. The anti-rotation mechanism 50 allows the connector 10 to be utilized once, while preventing reuse, which can result in faulty connections between the wires 15 and the combination insulation piercing and wire connector plate 11.

The anti-rotation mechanism 50 utilized interacting ramped surface and shoulders on the top gripping tabs 32 and 34 and the bottom gripping tabs 40 and 42 respectively, to allow the gradual engagement of the surfaces as the top and bottom portions 14 and 12 rotate to the second, closed position. However, other locations of the ramped surfaces and shoulders on the top portion 14 and the bottom portion 12 are within the scope of the present disclosure. When in the second, closed position, the substantially vertical shoulders on each of the gripping tabs 32 and 40 and each of gripping tabs 34 and 42 abut to prevent rotation in the reverse angular direction.

As best illustrated in FIG. 6, the top gripping tab 32 includes a ramped surface 60 starting proximate a leading edge 33 that raises to an apex 64. A substantially vertical shoulder 66 extends to a surface that is substantially even with the substantially horizontal shoulder 24. The top gripping tab 34 includes a ramped surface 68 that is similar to the ramped surface 60 where the ramped surface 68 starts proximate the leading edge 35 and raises to an apex 70. A substantially vertical shoulder 70 extends to a surface that is substantially even with the substantially horizontal shoulder 24.

As best illustrated in FIG. 7, the bottom gripping tab 40 includes a ramped surface 80 starting proximate a leading edge 41 that raises to an apex 82 substantially even with a surface 13 of the bottom portion 12. A substantially vertical shoulder 84 extends from the surface 13 to a distance above the surface 13. Similarly, the bottom gripping tab 42 includes a ramped surface 90 starting proximate a leading edge 43 that extends to an apex 92 that is substantially even with the surface 13 where a substantially vertical shoulder 94 extends from the surface 13 to a distance above the surface 13.

As the top portion 14 and the bottom portion 12 are rotated relative to each other from the first, open and unconnected position (as illustrated in FIG. 4) to the second, closed and connecting position (as illustrated in FIG. 5), the leading edges 33 and 35 of the top gripping tabs 32 and 34 align with the leading edges 41 and 43 of the bottom gripping tabs 40 and 42, respectively. Further rotation causes the ramped surfaces 60 and 68 of the top gripping tabs 32 and 34 to engage the ramped surfaces 80 and 90 of the bottom gripping tabs 40 and 32. Additional rotation causes the apexes 64 and 70 of the top gripping tabs 32 and 34 to disengage the apexes 82 and 92 of the bottom gripping tabs 40 and 342, which results in the substantially vertical shoulders 66 and 72 of the top gripping tabs 32 and 34 to abut the substantially vertical shoulders 84 and 94 of the bottom gripping tabs 40 and 42. As best illustrated in FIG. 8, the abutting substantially vertical shoulders 66 and 84 are illustrated which prevents reverse rotation of the bottom portion 12 relative to the top portion 14 such that the connector 10 is configured for a one-time use.

While components of the connector 10 are disclosed and described with reference to a direction, the use of direction, such as top, bottom, upper, lower, vertical, horizontal and the like are used for descriptive use only for purposes of the present disclosure. The connector 10 of the present disclosure can be utilized independent of direction and placement provided at least two wires are connected with the connecting plate.

Although the present disclosure has been described with reference to preferred embodiments, workers skilled in the art will recognize that changes may be made in form and detail without departing from the spirit and scope of the disclosure.

The invention claimed is:

1. A wire connector configured to connect at least two wires, the wire connector comprising:
- a first portion comprising:
  - a first main body having a first end and a second end and an exterior surface;
  - a plurality of spaced apart through bores in the first main body extending from the first end to the second end; and
  - opposing first stops extending from the exterior surface and having a portion of each of the first opposing stops extending above the first end, wherein the opposing first stops are located about 180° from each other;
- a second portion rotatably coupled to the first main body, the second portion comprising:
  - a second main body having an interior space;
  - a combination insulation piercing and wire connecting member comprising a plurality of apertures with arcuate slots extending from each of the plurality of apertures; and
  - opposing second gripping tabs extending from an exterior surface of the second main body, wherein opposing second gripping tabs are located about 180° from each other; and
- wherein when each of the opposing second gripping tabs abut each of the opposing first stops, the connector is in a first portion wherein each of the plurality of through bores in the first portion is aligned with each of the apertures in the connecting plate such that insulated wires can be inserted into the interior space of the second portion from the through bores of the first portion.

2. The wire connector of claim 1, wherein the first portion further comprises:
- opposing second stops spaced from the opposing first stops, the opposing second stops having a portion of each of the second opposing stops extending above the first end, wherein the opposing second stops are located about 180° from each other;
- wherein when the first and second portions are rotated relative to each other each of the opposing second gripping tabs abut each of the opposing second stops and substantially prevent further rotation of the first and second portions relative to each other, wherein when the second gripping tabs abut each of the opposing second stops the connector is in a second, closed or connecting position where the slots in the combination insulation piercing and wire connecting member pierce the insulation and engage the conductive wire.

3. The wire connector of claim 2, wherein the first opposing stops are located about 90° from the second opposing stops such that the connect moves from the first position to the second position with about a quarter turn of a revolution.

4. The wire connector of claim 2, wherein the first portion further comprises
- opposing first gripping tabs extending from the exterior surface of the first main body, wherein opposing first gripping tabs are located about 180° from each other wherein the opposing second stops extend from the opposing first gripping tabs.

5. The wire connector of claim 4, wherein each of the opposing first gripping tabs include a surface comprising:
- a first ramped surface; and
- a first shoulder.

6. The wire connector of claim 5, wherein each of the opposing second gripping tabs include a surface comprising:
- a second ramped surface; and
- a second shoulder, wherein when the connector is in the second, connecting position each of the second shoulders about one of the first shoulders, wherein the abutting first and second shoulder prevent counter-rotation toward the first, open position.

7. A toolless wire connector configured to connect at least two tracer wires, the wire connector comprising:
- a first portion comprising:
  - a first main body having a first end and a second end and an exterior surface;
  - a plurality of spaced apart through bores in the first main body extending from the first end to the second end; and opposing first gripping tabs extending from the exterior surface of the first main body, wherein the opposing first gripping tabs are located about 180°; and opposing first stops, each of the opposing first stops extending from each of the opposing first grip tabs, a portion of each of the first opposing stops extending above the first end;

a second portion rotatably coupled to the first main body, the second portion comprising:

a second main body having an interior space;

a combination insulation piercing and wire connecting member comprising a plurality of apertures with arcuate slots extending from each of the plurality of apertures; and opposing second gripping tabs extending from an exterior surface of the second main body, wherein opposing second gripping tabs are located about 180° from each other; and wherein when each of the opposing second gripping tabs abut each of the opposing first stops and substantially prevent further rotation of the first and second portions relative to each other, wherein when the second gripping tabs abut each of the opposing first stops, the combination insulation piercing and wire connecting member is in a second, closed or connecting position where the slots in the connecting plate pierce the insulation and engage the conductive wire.

8. The toolless wire connector of claim 7, wherein the first portion further comprises:

opposing second stops spaced from the opposing first stops, the opposing second stops having a portion of each of the second opposing stops extending above the first end, wherein the opposing second stops are located about 180° from each other;

wherein when the first and second portions are rotated relative to each other each of the opposing second gripping tabs abut each of the opposing second stops the connector is in a second portion wherein each of the plurality of through bores in the first portion is aligned with each of the apertures in the connecting plate such that insulated wires can be inserted into the interior space of the second portion from the through bores of the first portion.

9. The toolless wire connector of claim 8, wherein the first opposing stops are located about 90° from the second opposing stops such that the connect moves from the first position to the second position with about a quarter turn of a revolution.

10. The toolless wire connector of claim 8, wherein the first portion further comprises opposing first gripping tabs extending from the exterior surface of the first main body, wherein opposing first gripping tabs are located about 180° from each other wherein the opposing second stops extend from the opposing first gripping tabs.

11. The toolless wire connector of claim 10, wherein each of the opposing first gripping tabs include a surface comprising:

a first ramped surface; and a first shoulder.

12. The toolless wire connector of claim 11, wherein each of the opposing second gripping tabs include a surface comprising:

a second ramped surface; and a second shoulder, wherein when the connector is in the second, connecting position each of the second shoulders about one of the first shoulders, wherein the abutting first and second shoulder prevent counter-rotation toward the first, open position.

13. A method of electrically connecting a plurality of tracer wires, the method comprising:

providing a connector comprising:

a first portion comprising:

a first main body having a first end and a second end and an exterior surface;

a plurality of spaced apart through bores in the first main body extending from the first end to the second end; and opposing first stops extending from the exterior surface and having a portion of each of the first opposing stops extending above the first end, wherein the opposing first stops are located about 180° from each other;

a second portion rotatably coupled to the first main body, the second portion comprising:

a second main body having an interior space;

a combination insulation piercing and wire connecting member comprising a plurality of apertures with arcuate slots extending from each of the plurality of apertures; and opposing second gripping tabs extending from an exterior surface of the second main body, wherein opposing second gripping tabs are located about 180° from each other;

rotating the first and second portions relative to each other such that the opposing second gripping tabs abuts one of the opposing first stops such that the plurality of apertures in the combination insulation piercing and wire connecting member align with the plurality of spaced apart through bores in the first portion;

inserting an end of a first tracer wire through one of the plurality of spaced apart through bores, one of the plurality of apertures and into the interior space of the second portion; and inserting an end of a second tracer wire through another one of the plurality of spaced apart through bores, another one of the plurality of apertures and into the interior space of the second portion.

14. The method of claim 13 wherein providing the connector further comprises:

providing the first portion with a second set of stops extending from the first main body wherein the second set of stops are located about 180° from each other.

15. The method of claim 14, and further comprising:

rotating the first and second portions relative to each other such that the opposing second gripping tabs abut the second set of stops wherein the combination insulation piercing and wire connecting member is rotated relative to the first and second tracer wires and the arcuate slots engage the first and second tracer wires to electrically connect the first and second tracer wires.

16. The method of claim 15, wherein the first and second tracer wires each comprise an insulating jacket along a length of each wire, wherein when the plurality of arcuate slots engages the first and second tracer wires, the plurality of arcuate slots pierce each of the insulating jackets and make contact with both of the first and second wires to electrically connect the first and second wires.

17. The method of claim 15, wherein the first and second portions each comprise shoulders that engage when the opposing second gripping tabs abut the second set of stops, the shoulders abut and prevent counter-rotation of the first and second portions relative to each other.

18. The method of claim 15, wherein the rotating of the first and second portions relative to each other comprises about a quarter of a full turn.

19. The method of claim 15, and further comprising positioning the connector and the first and second tracer wires proximate a utility supply line below ground.

20. The method of claim 19, and further comprising burying the connector and the first and second tracer wires proximate the utility supply line.

* * * * *